US005999138A

United States Patent [19]

Ponce de Leon

[11] Patent Number: 5,999,138

[45] Date of Patent: Dec. 7, 1999

[54] LOW POWER SWITCHED DIVERSITY ANTENNA SYSTEM

[76] Inventor: Lorenzo A. Ponce de Leon, 7607 Wentworth Dr., Lake Worth, Fla. 33467

[21] Appl. No.: 09/050,297

[22] Filed: Mar. 30, 1998

[51] Int. Cl.[6] .......... H04B 1/18

[52] U.S. Cl. .......... 343/745; 343/797; 343/876; 343/850; 455/293; 455/280

[58] Field of Search .......... 343/745, 797, 343/876, 850, 756; 455/293, 280, 297

[56] References Cited

U.S. PATENT DOCUMENTS

| | | | |
|---|---|---|---|
| 3,550,137 | 12/1970 | Kuecken | 343/744 |
| 3,718,932 | 2/1973 | Ikrath et al. | 343/728 |
| 3,909,830 | 9/1975 | Campbell | 343/703 |
| 4,198,641 | 4/1980 | Gibson | 343/797 |
| 4,518,965 | 5/1985 | Hidaka | 343/742 |
| 4,584,709 | 4/1986 | Kneisel et al. | 343/702 |
| 4,625,212 | 11/1986 | Oda et al. | 343/702 |
| 4,984,296 | 1/1991 | Scholtz | 455/193 |
| 5,334,988 | 8/1994 | Murakami et al. | 343/704 |
| 5,446,922 | 8/1995 | Siwiak et al. | 455/277.2 |
| 5,469,178 | 11/1995 | Nguyen et al. | 343/702 |
| 5,617,084 | 4/1997 | Sears | 340/870.02 |
| 5,686,929 | 11/1997 | Thiere et al. | 343/792.5 |
| 5,821,820 | 8/1997 | Snider et al | 331/48 |

*Primary Examiner*—Hoanganh Le
*Assistant Examiner*—James Clinger
*Attorney, Agent, or Firm*—James A. Lamb

[57] ABSTRACT

A low power switched diversity antenna system (200) includes two varactor tuned antennas (205, 207), each including an antenna element (505) and a varactor (515). The varactor tuned antennas intercept components of electromagnetic radiation that are substantially orthogonally polarized. One of the varactor tuned antennas is tuned to a desired frequency and the other is detuned, achieving a relative gain of the tuned varactor tuned antenna to the detuned varactor tuned antenna of at least 3 dB at the desired frequency.

18 Claims, 4 Drawing Sheets

120

LOW POWER SWITCHED DIVERSITY ANTENNA SYSTEM

FIELD OF THE INVENTION

This invention relates in general to diversity antennas and in particular to switched diversity antenna systems.

BACKGROUND OF THE INVENTION

Electrical power drain and highly sensitive reception of radio signals have been critical design parameters of portable electronic devices such as pagers and personal communication devices for many years.

When an electronic device is used to receive a radio signal in a communication system in which the radiation (transmission) of electromagnetic energy is reflected and absorbed by numerous objects, such as buildings, vehicles, and trees, the resulting electromagnetic energy environment is described as a fading environment, and the components of the electromagnetic energy waves that are orthogonally polarized have low correlation of their amplitude and phase. A known technique of increasing the sensitivity of electronic devices to the reception of such radio signals in such systems is to use two receiving antennas arranged so as to respond to substantially orthogonal polarizations of the electromagnetic energy, such as linear polarizations 90 degrees apart, carrying the radio signal. When two antennas are used that intercept polarizations of the electromagnetic waves that are approximately 90 degrees apart, the radio signal intercepted by a second one of the two antennas can be used to augment the radio signal intercepted by a first one of the two antennas. This is called diversity reception.

Although the radio signals intercepted by the two receiving antennas can be added together to increase the average strength of the intercepted energy coupled to a receiver, doing so in a manner that avoids situations wherein the two signals partially or wholly cancel each other when their phases are approximately or exactly 180 degrees apart is technically complex. That technique is know as diversity combining. A very common alternative approach for using two such antennas, which is simple and works well, is to select the antenna that has a stronger signal. When this technique is used, a means to switch the antennas is needed, as well as a method to select the stronger signal.

A common technique for switching the antennas is to use PIN diodes. In this technique, one PIN diode is used to turn one antenna on while a second PIN diode is used to turn the other antenna off, until the switching is reversed. Because only one signal is received at a time, an algorithm is used to cause switching when the presently received signal is too weak, or upon another occasion (such as a timed selection). The PIN diode that is off is reversed biased and therefore draws only leakage current. The PIN diode that is on, though, is forward biased and typically draws on the order of 1 to 10 milliamps. Such a technique has been used for over ten years, but this much current drain is substantial in a product such as a pager.

Therefore, what is needed is a means for achieving a switched diversity antenna that draws substantially less than 1 milliamp.

DETAILED DESCRIPTION OF THE PREFERRED EMBODIMENT

The present invention utilizes two varactor tuned antennas that are arranged to intercept components of electromagnetic energy that are substantially 90 degrees apart. The intercepted energy is coupled to a receiver. Two fixed, reverse biases are coupled to two varactor diodes. One varactor diode tunes one varactor tuned antenna (an ON antenna) to a desired frequency while the second tunes a second varactor tuned antenna (an OFF antenna) to an out of band frequency (herein called the rejection frequency), to which the receiver is non-responsive, which reduces the gain of the OFF varactor tuned antenna at the desired frequency. Both varactor diodes are reverse biased, so the total power drain requirement for switching the varactor tuned antennas is extremely small. The ratio of the gain of the ON varactor tuned antenna to the OFF varactor tuned antenna at the desired frequency is substantial, typically at least 10 decibels (dB). This switching substantially eliminates any potential interference of the signals recovered by the two varactor tuned antennas, which prevents partial or total mutual cancellation when the components are out of phase, and permits a selection of a stronger one of the two components to be used for receiving the intercepted signal.

Figure 1:
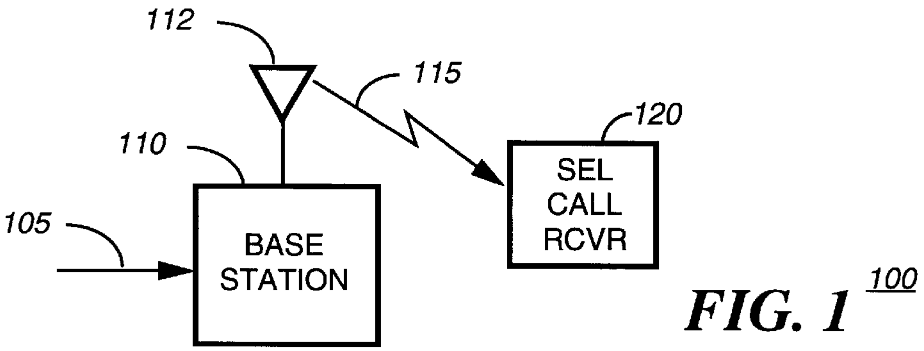
FIG. 1 is an electrical block diagram of a radio communication system that includes a selective call radio, in accordance with the preferred and alternative embodiments of the present invention.

Referring to FIG. 1, an electrical block diagram of a radio communication system 100 that includes a selective call radio 120 is shown, in accordance with the preferred and alternative embodiments of the present invention. The radio communication system 100 includes at least one base station 110 and a selective call radio 120. The base station 110 is a portion of a conventional fixed network of the radio communication system 100, and the selective call radio 120 is representative of pagers and other radio receiving devices, such as personal communication devices that can operate in the radio communication system 100. A signal 105 including a message intended for the selective call radio 120 is coupled to the base station 110, which performs standard conversion of the signal to radio energy that is coupled to a base station antenna 110, which radiates the energy as electromagnetic energy. The electromagnetic energy is reflected and absorbed by many different objects in the environment (not shown in FIG. 1), which results in a field of electromagnetic energy characterized as having faded signals, which is a phenomena well known to one of ordinary skill in the art. The selective call radio 120 intercepts some of the electromagnetic energy 115 (the electromagnetic energy 115 is alternatively referred to herein as a radiated signal 115) and receives the message transmitted therein when the electromagnetic energy is strong enough.

Figure 2:
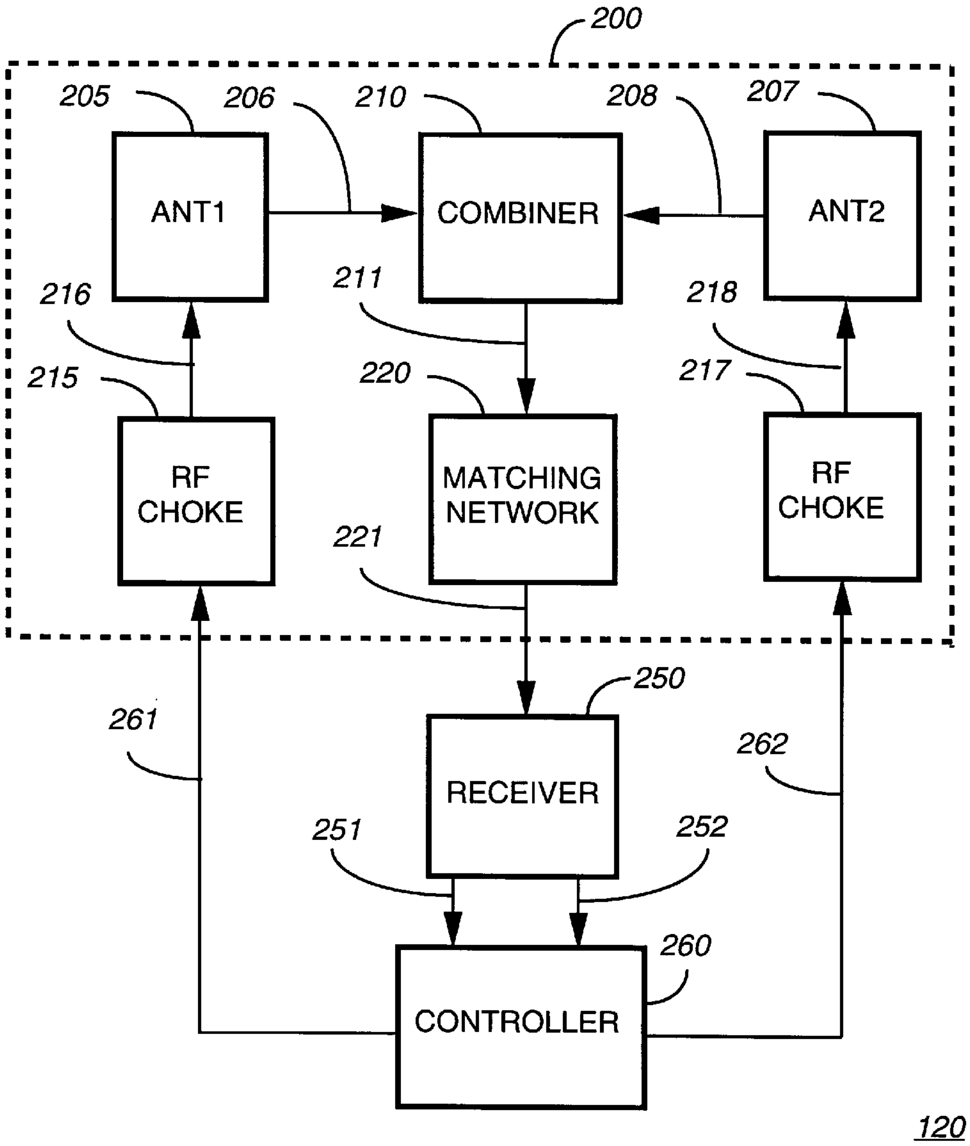
FIG. 2 is an electrical block diagram of the selective call radio including a low power switched diversity antenna system, in accordance with the preferred and alternative embodiments of the present invention.

Referring to FIG. 2, an electrical block diagram of the selective call radio 120 is shown, in accordance with the preferred and alternative embodiments of the present invention. The selective call radio 120 comprises a low power switched diversity antenna system 200, a receiver 250, and a controller 260. When the selective call radio 120 is powered on, one of two bias signals (also referred to more simply as biases) 261, 262 is set to a first value (i.e., a first DC voltage) of that bias and the other of the two biases 261, 262 is set to a second value (i.e., a second DC voltage) of that bias. The biases 261, 262 are coupled to the low power switched diversity antenna system 200, which comprises two radio frequency (RF) chokes 215, 217, two varactor tuned antennas 205, 207, a combiner 210, and a matching network 220. The first bias 261 is coupled through choke 215, wherefrom a choked bias 216 is coupled to a varactor in a first varactor tuned antenna (ANT1) 205. The RF choke 215 presents a high impedance to RF frequencies, particularly those within a normal tuning range of the selective call radio 120. The RF choke also presents a direct current (DC) impedance to the bias that is low relative to the DC impedance of the varactor tuned antenna, which is very high because, as will be described in more detail below, the varactor in the varactor tuned antenna is reversed biased in both switching conditions. Thus, a high value resistor, such as a conventional 100 kilohm (kOhm), or a inductive choke can be used for the RF choke. A 100 kOhm is preferable as it is smaller and cheaper than an inductive choke. Similarly, the second bias 262 is coupled through the RF choke 217, wherefrom a choked bias 218 is coupled to a second varactor tuned antenna (ANT2) 207. The one of the varactor tuned antennas 205, 207 that is coupled to the first value is tuned to a desired frequency that is within the normal tuning range of the selective call radio 120, while the other of the varactor tuned antennas 205, 207 is tuned substantially away from the desired frequency, to a frequency called herein the rejection frequency. In accordance with the preferred embodiment of the present invention, the desired frequency is approximately 930 MHz. The varactor tuned antennas 205, 207 are physically arranged so that they recover components of the electromagnetic radiation that are polarized approximately 90 degrees apart (i.e., the components are essentially orthogonally polarized). Due to the switched tuning, the intercepted signal component recovered by the ON varactor tuned antenna is substantially stronger at the desired frequency than the component recovered by the OFF varactor tuned antenna. The intercepted signal components 206, 208 recovered by two varactor tuned antennas 205, 207 are coupled to a combiner network 210 that sums the components together in an essentially linear manner. The resultant signal 211 is coupled to a matching network 220 that couples the signal, called herein a receiver port signal, to the receiver 250 at a predetermined impedance that is designed to match an nominal input impedance of the receiver 250. The receiver 250 then receives the signal and generates a root sum of squares indicator (RSSI) 251 and a demodulated signal 252 that are coupled to the controller 260. The controller 260 recovers information from the RSSI 251 and demodulated signal 252 that is used to determined whether to keep the biases 261, 262 in their present state, or to switch the bias at the first value to a second value and likewise switch the bias at the second value to a first value, thereby reversing the gains of he varactor tuned antennas at the desired frequency. As explained more fully below, the first value of the first bias 261 is not necessarily the same the first value of the second bias 262. The second values of the biases 261, 262 are preferably the same, but are not necessarily the same.

Figure 3:
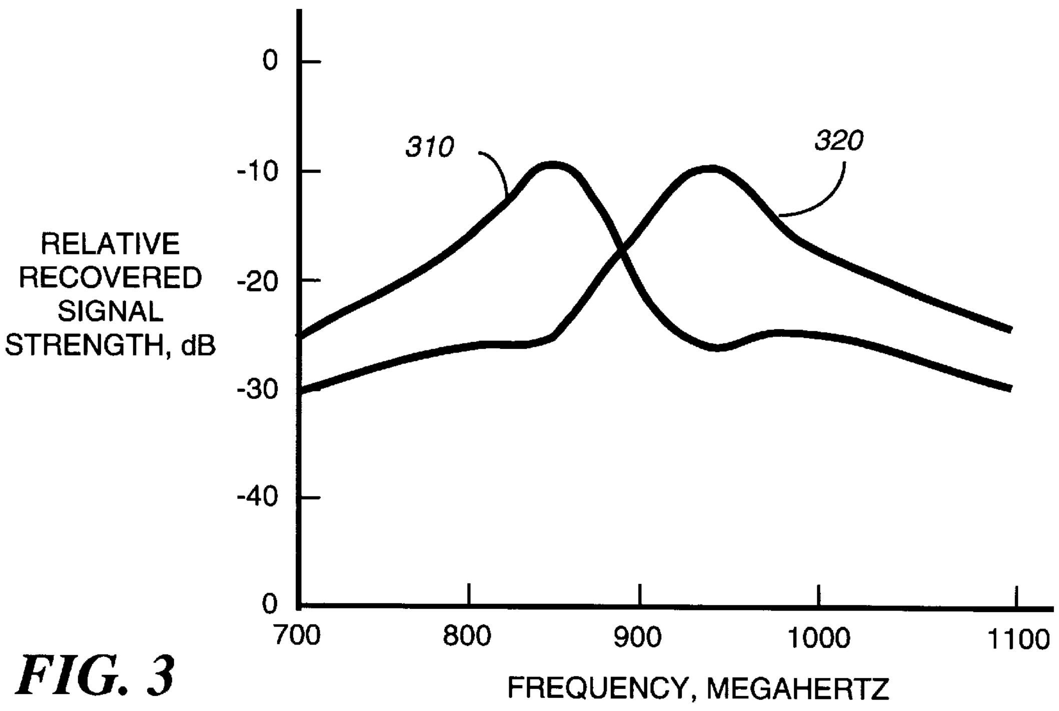
FIG. 3 is a graph of the frequency response of varactor tuned antennas used in the low power switched diversity antenna system, in accordance with the preferred and alternative embodiments of the present invention.

Referring to FIG. 3, a graph of the frequency response of the varactor tuned antennas 205, 207 used in the low power switched diversity antenna system 200 is shown, in accordance with the preferred and alternative embodiments of the present invention. Curve 310 represents the typical gain of the varactor tuned antennas 205, 207 when they are off (the second value of bias is coupled thereto), while curve 320 represents the typical gain when they are on. It will be appreciated that the curves show that the ratio of the gain of an ON varactor tuned antenna to an OFF varactor tuned antenna at the desired frequency (where curve 320 is at its maximum value) is approximately 15 dB. At this ratio, undesirable effects of the component of the signal recovered by the OFF varactor tuned antenna has very little affect on the component from the ON varactor tuned antenna. It will be further appreciated that ratios of at least 10 dB are typically easily achieved at most RF frequencies without undue cost or size of parts, and that at a ratio of 10 dB or more, the effects of the combination of the OFF intercepted signal component (one of the intercepted signal components 206, 208) with the ON intercepted signal component (the other of the intercepted signal components 206, 208) has virtually no affect on the ON intercepted component. Although not preferable, benefits of the present invention are achieved, to a lesser extent, when the ratio of the ON to the OFF intercepted signal component is as low as 3 dB.

It will be further appreciated that in the preferred embodiment of the present invention, the OFF antenna is tuned to a frequency named herein the rejection frequency, which can be alternatively described as simply being detuned, and that this is a method of accomplishing the desired objective of achieving a gain of the OFF antenna at the desired frequency that is at least 3 dB less than that of the ON antenna at the desired frequency.

Figure 4:
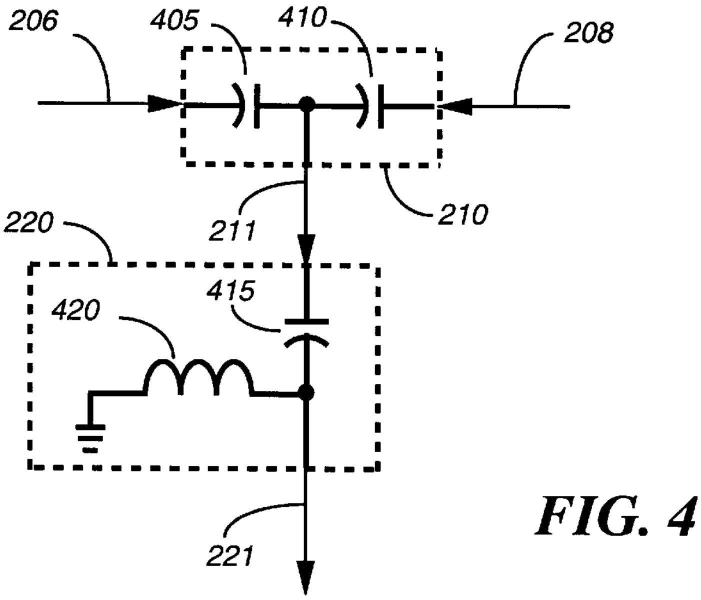
FIG. 4 is an electrical schematic diagram of a combiner and matching network portion of the low power switched diversity antenna system, in accordance with the preferred and alternative embodiments of the present invention.

Referring to FIG. 4, an electrical schematic diagram of the combiner 210 and matching network 220 of the low power switched diversity antenna system 200 is shown, in accordance with the preferred and alternative embodiments of the present invention. The combiner is a conventional passive network for combines the signals from the two varactor tuned antennas, comprising two capacitors 405, 410 that are each 1 picoFarad, in accordance with the preferred and alternative embodiments of the present invention. The matching network is also a conventional passive network for impedance matching, comprising a series coupled 5 picoFarad capacitor 415 and a 10 nanoHenry coil 420 coupled to ground. Other values for the capacitors 405, 410, 415 and the coil 420 are appropriate when the selective call radio 120 operates at desired frequency of significantly different value.

Figure 5:
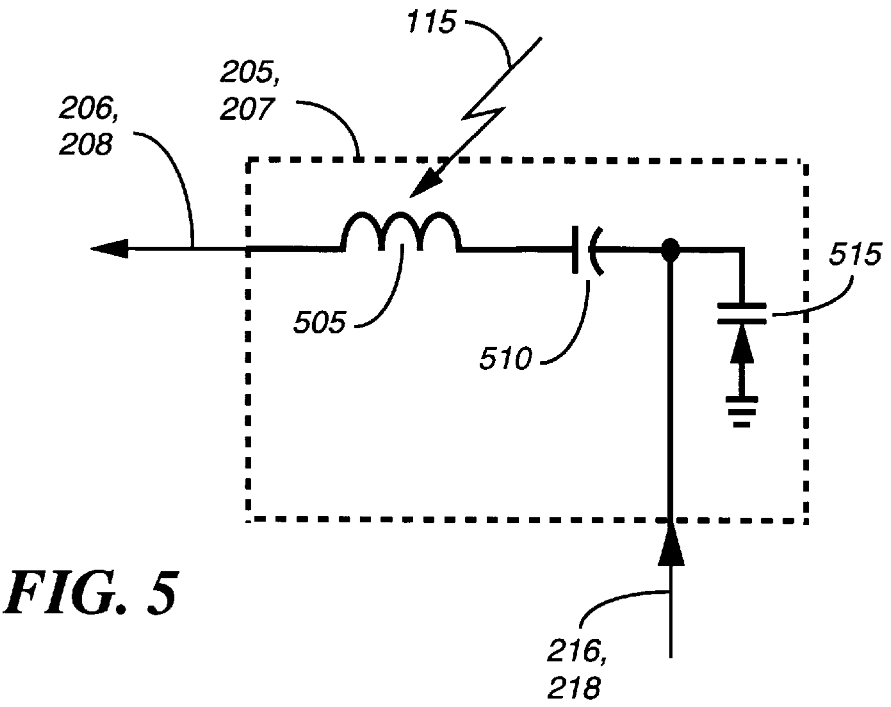
FIG. 5 is an electrical schematic diagram of a loop antenna used in the low power switched diversity antenna system, in accordance with the preferred embodiment of the present invention.

Referring to FIG. 5, an electrical schematic diagram of a loop antenna version of the varactor tuned antennas 205, 207 used in the low power switched diversity antenna system 200 is shown, in accordance with the preferred embodiment of the present invention. The varactor tuned antennas 205, 207 each intercept the electromagnetic energy 115, and each comprises a varactor 515, a capacitor 510, and a loop antenna element 505. The anode of the varactor diode is coupled to ground and the cathode is coupled to one of the choked biases 216, 218 (depending on the antenna). The cathode of the varactor 515 is coupled through the capacitor 510 to the loop antenna element 505. The other end of the loop antenna element 505 couples the intercepted signal components 206, 208 to the combiner 210. The capacitor 510 is preferably 2 picoFarads and presents a low impedance at the desired frequency, while blocking the bias 216, 218. The loop antenna element 505 is a conventional loop antenna element having a typical effective impedance of 50 nanoHenrys and 2 Ohms, and is preferably implemented as a wire loop mounted to a printed circuit board. The loop antenna element 505 of the varactor tuned antennas 205 is oriented within the selective call radio 120 at 90 degrees with respect to the loop antenna element 505 of the varactor tuned antenna 207. The first value of the first bias 261 is set so as to optimize the gain of varactor tuned antenna 205 at the desired frequency, and the first value of the second bias 261 is set so as to optimize the gain of varactor tuned antenna 207 at the desired frequency. Accordingly, the first values of the biases 261, 262 are not necessarily the same, but can alternatively set to be a first predetermined value determined during the design of the low power switched diversity antenna system 200 with little degradation in performance of the present invention. The second values of the biases 261, 262 are less critical and are preferably set to a second predetermined value. Both the first and second values of the first and second biases 261, 262 are positive voltages that reverse bias the varactors 515. Thus, only leakage current is provided by the biases 261, 262, resulting in a current drain substantially below a microampere, which is orders of magnitude below the current drain of a prior art PIN diode switched diversity antenna system. The varactor is a conventional varactor diode, preferably a model MMBV2101LT1 varactor diode manufactured by Motorola, Inc. of Schaumburg, Ill. The biases 261, 262 are chosen to vary the capacitance of the varactor 515 by approximately a two to one ratio, which achieves a ratio of antenna gains of approximately 15 dB between the on and off states of the varactor tuned antennas 205, 207.

Figure 6:
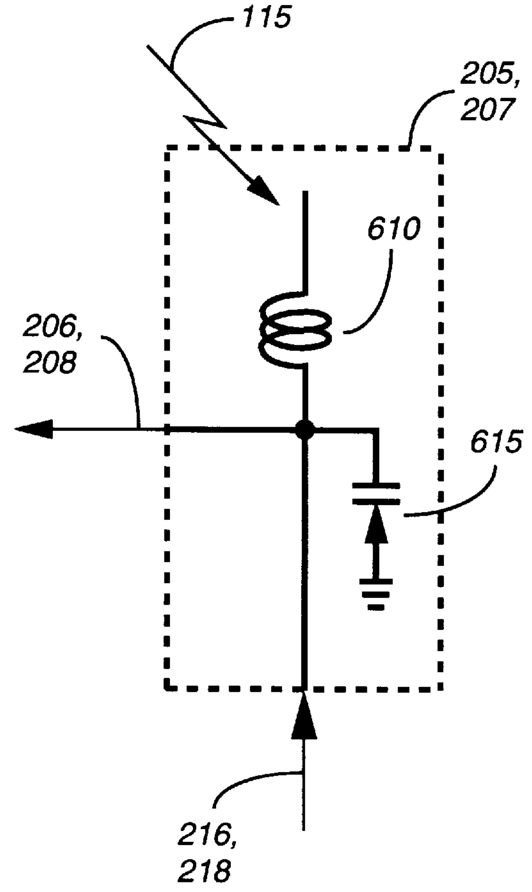
FIG. 6 is an electrical schematic diagram of a monopole antenna used in the low power switched diversity antenna system, in accordance with the alternative embodiment of the present invention.

Referring to FIG. 6, an electrical schematic diagram of a monopole antenna version of the varactor tuned antennas 205, 207 used in of the low power switched diversity antenna system 200 is shown, in accordance with the alternative embodiment of the present invention. In the monopole antenna version of the varactor tuned antennas 205, 207, the varactor 615 is coupled between the choked bias 216, 218 and ground, as described above for the loop antenna version. A feed end of the monopole antenna element 610 is coupled to the cathode of the varactor 615 and to the combiner 210. The monopole antenna element 610 is a conventional inductive loaded monopole antenna element, and the varactor 615 is a conventional varactor having a value chosen to resonate with the monopole antenna element 610 at the desired frequency when the first value of the bias 216, 218 is applied. The monopole antenna elements 610 are physically situated in the selective call radio 120 at 90 degrees relative to one another, achieving the same result as that achieved with the loop antenna version of the varactor tuned antennas 205, 207, which is the interception of essentially uncorrelated samples of the electromagnetic energy 115.

Figure 7:
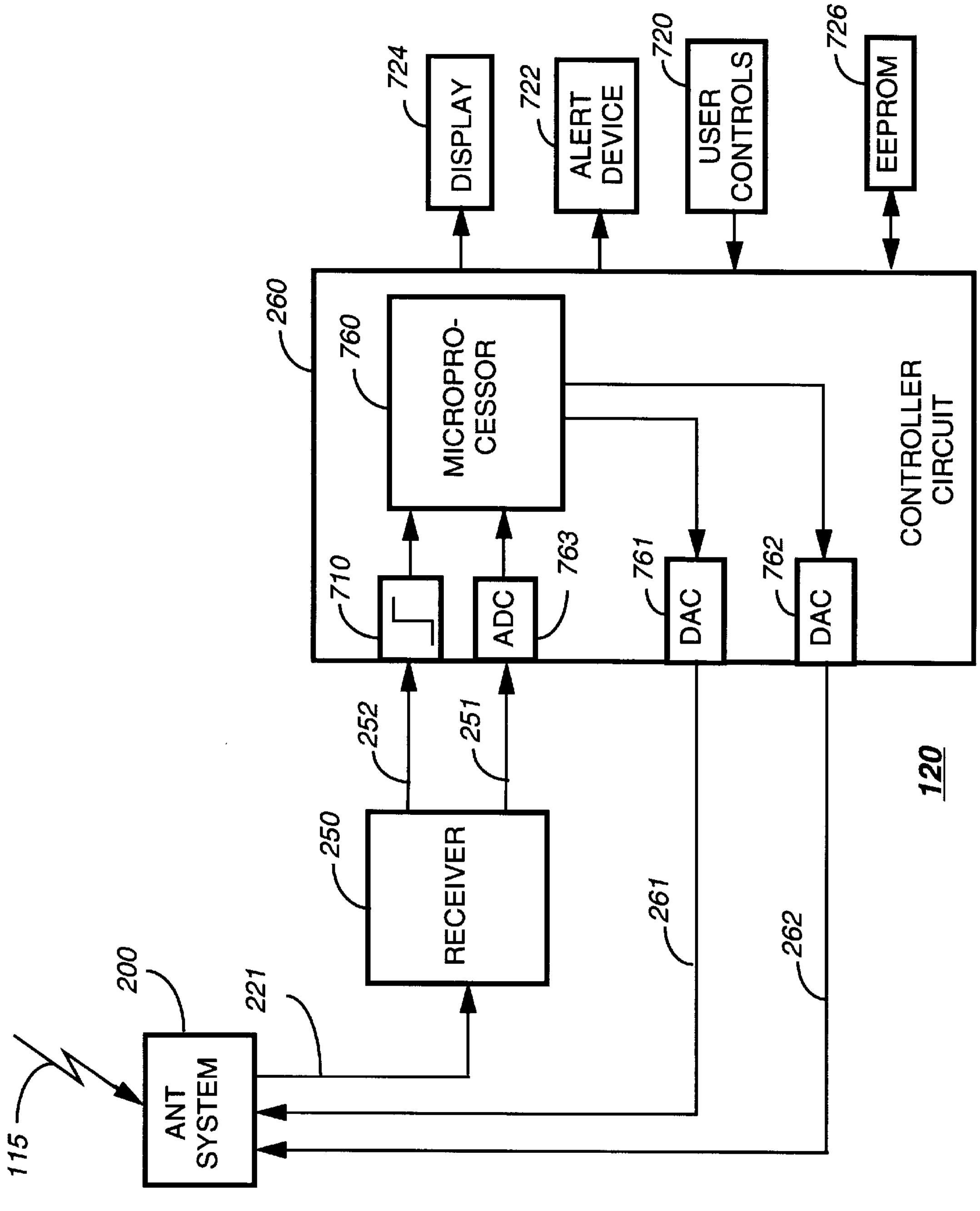
FIG. 7 is an electrical block diagram of a selective call radio, in accordance with the preferred and alternative embodiments of the present invention.

Referring to FIG. 7, an electrical block diagram of the selective call radio 120 is shown, in accordance with the preferred and alternative embodiments of the present invention. The selective call radio 120 includes the low power switched diversity antenna system 200 for intercepting the radiated signal 115. The low power switched diversity antenna system 200 converts the intercepted radiated signal 115 to a conducted radio signal 221 that is coupled to a receiver 250 wherein the conducted radio signal 221 is received. The receiver 250 is a conventional receiver that rejects portions of the conducted radio signal 221 that are near the rejection frequency. The receiver 250 accomplishes the rejection by amplifying the rejected portions of the conducted radio signal 221 with a gain substantially below the gain at which portions of the conducted radio signal 221 that are near the desired frequency are amplified. For example, the ratio of the gain of the conducted radio signal 221 near the desired frequencies to the gain near the rejection frequencies is typically greater than 70 dB. The receiver 250 converts the portions of the conducted radio signal 221 that are near the desired frequency and generates the RSSI 251 and the demodulated signal 252 that are coupled to the controller 260. The controller 260 is coupled to a display 724, an alert 722, a set of user controls 720, and an electrically erasable read only memory (EEPROM) 726. The controller 260 comprises a digital conversion circuit 710, two digital to analog converters 761, 762, an analog to digital converter (ADC) 763, and a microprocessor 760. The demodulated signal 252 is coupled to the digital conversion circuit 710 wherein it is converted to a binary signal that is coupled to the microprocessor 760. The RSSI 251 is coupled to the ADC 763 that converts the RSSI 251 to a binary word that is coupled to the microprocessor 760. The microprocessor 760 is coupled to the EEPROM 726 for storing an embedded address stored therein during a maintenance operation and for loading the embedded address during normal operations of the radio 120. The microprocessor 760 is a conventional microprocessor comprising a central processing unit (CPU), a read only memory (ROM), and a random access memory (RAM).

A message processor function of the microprocessor 760 decodes outbound words and processes an outbound message when an address received in an address field of an outbound signaling protocol matches an embedded address stored in the EEPROM 726, in a manner well known to one of ordinary skill in the art. An outbound message that has been determined to be for the selective call radio 120 by the address matching is processed by the message processor function according to the contents of the outbound message and according to modes set by manipulation of the set of user controls 720, in a conventional manner. An alert signal is typically generated when an outbound message includes user information. The alert signal is coupled to the alert device 722, which is typically either an audible or a silent alerting device.

When the outbound message includes alphanumeric or graphic information, the information is displayed on the display 724 in a conventional manner by a display function at a time determined by manipulation of the set of user controls 720.

While the selective call radio 120 is receiving a radio signal, the controller 260 determines which varactor tuned antenna 205, 207 is to be ON, and which varactor tuned antenna 205, 207 is to be OFF, by determining a quality associated with the demodulated signal 252 being received from the low power switched diversity antenna system 200, and qualities associated with previous demodulated signals 252 received from the low power switched diversity antenna system 200 when the varactor tuned antennas 205, 207 were in different ON and OFF states, and comparing these quality determinations to each other and predetermined quality levels, in a conventional manner. For example, in a simple method, the RSSI 251 associated with the present demodulated signal 252 is compared to a predetermined level, and while the RSSI 251 is above the predetermined level, the varactor tuned antennas 205, 207 are not switched, but when the RSSI 251 goes below the predetermined level for a predetermined time, the varactor tuned antennas 205, 207 are switched.

By now it should be appreciated that there has been provided a switched diversity antenna system that operates at current drains substantially lower than those of prior art switched diversity antenna systems, thereby permitting the use of switched diversity antennas in portable devices such as pagers to enhance the receiving sensitivity. Furthermore, because the present invention has a high DC impedance of the switched varactor tuned antennas, resistors can be used instead of chokes to couple the biases to the varactor tuned antennas, thereby reducing cost and size.

I claim:

1. A low power switched diversity antenna system for intercepting electromagnetic radiation at a desired frequency, comprising:

a first varactor tuned antenna comprising a first antenna element that intercepts a first polarized component of the electromagnetic radiation, and a first varactor coupled to the first antenna element, wherein the first varactor tunes the first varactor tuned antenna to the desired frequency in response to a first value of a first bias and tunes the first varactor tuned antenna to a rejection frequency in response to a second value of the first bias; and a second varactor tuned antenna coupled to the first varactor tuned antenna, comprising a second antenna element oriented such that the second varactor tuned antenna responds to a second polarized component of the electromagnetic radiation that is essentially orthogonally polarized with respect to the first polarized component, and a second varactor coupled to the second antenna element, wherein the second varactor tunes the second varactor tuned antenna to the desired frequency in response to a first value of a second bias and tunes the second varactor tuned antenna to a rejection frequency in response to a second value of the second bias.

2. The low power switched diversity antenna system according to claim 1, further comprising:

a combining network having an input for each of the first and second varactor tuned antennas that combines the first polarized component and the second polarized component.

3. The low power switched diversity antenna system according to claim 2, further comprising:

a matching network coupled to the combining network that provides a receiver port signal at a predetermined impedance.

4. The low power switched diversity antenna system according to claim 1, further comprising:

a controller that provides the first bias and the second bias, wherein the second value of the second bias is provided while the first value of the first bias is provided, and the second value of the first bias is provided while the first value of the second bias is provided.

5. The low power switched diversity antenna system according to claim 1, wherein a relative recovered signal strength of the first varactor tuned antenna and the second varactor tuned antenna is at least 3 dB when the first bias is at the first value and the second bias is at the second value.

6. The low power switched diversity antenna system according to claim 1, wherein the first and second values of the first and second biases are reverse bias values.

7. A portable electronic device comprising a low power switched diversity antenna system for intercepting electromagnetic radiation at a desired frequency, comprising:

a first varactor tuned antenna comprising a first antenna element that intercepts a first polarized component of the electromagnetic radiation, and a first varactor couDled to the first antenna element, wherein the first varactor tunes the first varactor tuned antenna to the desired frequency in response to a first value of a first bias and tunes the first varactor tuned antenna to a reiection frequency in response to a second value of the first bias; and a second varactor tuned antenna coupled to the first varactor tuned antenna, comprising a second antenna element oriented such that the second varactor tuned antenna responds to a second polarized component of the electromagnetic radiation that is essentially orthogonally polarized with respect to the first polarized component, and a second varactor coupled to the second antenna element, wherein the second varactor tunes the second varactor tuned antenna to the desired frequency in response to a first value of a second bias and tunes the second varactor tuned antenna to a reception frequency in response to a second value of the second bias.

8. The portable electronic device according to claim 7, further comprising a receiver that amplifies signals at the desired frequency substantially more than signals at the rejection frequency.

9. A low power switched diversity antenna system for intercepting electromagnetic radiation at a desired frequency, comprising:

a first varactor tuned antenna comprising a first antenna element that intercepts a first polarized component of the electromagnetic radiation, and a first varactor coupled to the first antenna element that is tuned by a first bias; and a second varactor tuned antenna coupled to the first varactor tuned antenna, comprising a second antenna element oriented such that the second varactor tuned antenna responds to a second polarized component of the electromagnetic radiation that is essentially orthogonally polarized with respect to the first polarized component, and a second varactor coupled to the second antenna element that is tuned by a second bias, wherein when the first bias is in a first state and the second bias is in a second state, a ratio of a gain of the first varactor tuned antenna to the second varactor tuned antenna is at least 3 dB, and wherein when the second bias is in a first state and the first bias is in a second state, the ratio of the gain of the first varactor tuned antenna to the second varactor tuned antenna is less than −3 dB.

10. The low power switched diversity antenna system according to claim 9, further comprising:

a combining network having an input for each of the first and second varactor tuned antennas that combines the first polarized component and the second polarized component.

11. The low power switched diversity antenna system according to claim 10, further comprising:

a matching network coupled to the combining network that provides a receiver port signal at a predetermined impedance.

12. The low power switched diversity antenna system according to claim 9, further comprising:

a controller that provides the first bias and the second bias, wherein the second value of the second bias is provided while the first value of the first bias is provided, and the second value of the first bias is provided while the first value of the second bias is provided.

13. The low power switched diversity antenna system according to claim 9, wherein the first and second values of the first and second biases are reverse bias values.

14. A portable electronic device comprising a low power switched diversity antenna system for intercepting electromagnetic radiation at a desired frequency, comprising:

a first varactor tuned antenna comprising a first antenna element that intercepts a first polarized component of the electromagnetic radiation, and a first varactor coupled to the first antenna element that is tuned by a first bias: and a second varactor tuned antenna coupled to the first varactor tuned antenna, comprising a second antenna element oriented such that the second varactor tuned antenna responds to a second polarized component of the electromagnetic radiation that is essentially orthogonally polarized with respect to the first polarized component, and a second varactor coupled to the second antenna element that is tuned by a second bias, wherein when the first bias is in a first state and the second bias is in a second slate, a ratio of a gain of the first varactor tuned antenna to the second varactor tuned antenna is at least 3 dB, and wherein when the second bias is in a first state and the first bias is in a second state, the ratio of the gain of the first varactor tuned antenna to the second varactor tuned antenna is less than −3 dB.

15. The low power switched diversity antenna system according to claim 4, wherein the controller switches the values of the first and second biases in response to a quality associated with a demodulated signal derived from the intercepted electromagnetic radiation.

16. The portable electronic device according to claim 7, further comprising a receiver coupled to the low power switched diversity antenna and a controller coupled to the receiver and the low power switched diversity antenna, wherein the controller switches the values of the first and second biases in response to a quality determined from a demodulated signal generated by the receiver from the intercepted electromagnetic radiation.

17. The low power switched diversity antenna system according to claim 12, wherein the controller switches the values of the first and second biases in response to a quality associated with a demodulated signal derived from the intercepted electromagnetic radiations.

18. The portable electronic device according to claim 14, further comprising a receiver coupled to the low power switched diversity antenna and a controller coupled to the receiver and the low power switched diversity antenna, wherein the controller switches the values of the first and second biases in response to a quality determined from a demodulated signal generated by the receiver from the intercepted electromagnetic radiation.

* * * * *